United States Patent
Ghannam et al.

(10) Patent No.: US 11,514,273 B2
(45) Date of Patent: Nov. 29, 2022

(54) VEHICLE DEBRIS STRIKE MITIGATION

(71) Applicant: Ford Global Technologies, LLC, Dearborn, MI (US)

(72) Inventors: Mahmoud Yousef Ghannam, Canton, MI (US); Aed M. Dudar, Canton, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 609 days.

(21) Appl. No.: 16/575,966

(22) Filed: Sep. 19, 2019

(65) Prior Publication Data

US 2021/0089815 A1 Mar. 25, 2021

(51) Int. Cl.
*G06K 9/62* (2022.01)
*G01S 17/89* (2020.01)
(Continued)

(52) U.S. Cl.
CPC ....... *G06K 9/627* (2013.01); *B60W 30/18163* (2013.01); *B60W 40/06* (2013.01);
(Continued)

(58) Field of Classification Search
CPC ......... B60W 2400/00; B60W 2420/42; B60W 2420/52; B60W 2552/00; B60W 2554/00; B60W 2720/10; B60W 30/143; B60W 30/18163; B60W 40/06; B60W 2554/4023; B60W 2756/10; B60W 30/09; B60W 30/0956; B60W 50/0097; B60W 50/14;
(Continued)

(56) References Cited

U.S. PATENT DOCUMENTS 5,554,983 A * 9/1996 Kitamura ................. G08G 1/04
382/209
6,168,225 B1 1/2001 Deng et al.
(Continued)

FOREIGN PATENT DOCUMENTS

CN 106427490 A 2/2017
DE 19937461 A1 2/2001
(Continued)

OTHER PUBLICATIONS

Non-Final Office Action dated Mar. 22, 2019, U.S. Appl. No. 15/598,797, filed May 18, 2017.
(Continued)

*Primary Examiner* — Babar Sarwar
(74) *Attorney, Agent, or Firm* — Frank A. MacKenzie; Bejin Bieneman PLC

(57) ABSTRACT

A vehicle computer comprises a processor and a memory. The memory stores instructions executable by the processor to detect debris flying above a roadway, to input vehicle sensor data to a first classifier that outputs a source of the debris, and based on the source of the debris, to compare sensor data representing the debris to stored reference data to determine a type of physical material included in the debris. The memory stores instruction to input the type of physical material and an environmental condition to a second classifier that outputs a risk assessment, and to actuate the vehicle based on the risk assessment.

20 Claims, 3 Drawing Sheets

(51) Int. Cl.
*G06N 3/02* (2006.01)
*B60W 30/18* (2012.01)
*B60W 40/06* (2012.01)

(52) U.S. Cl.
CPC ............... *G01S 17/89* (2013.01); *G06N 3/02* (2013.01); *B60W 2400/00* (2013.01); *B60W 2420/52* (2013.01); *B60W 2554/00* (2020.02)

(58) Field of Classification Search
CPC .. B60W 60/0015; G01S 17/89; G01S 17/931; G06K 9/627; G06K 9/6271; G06K 9/6293; G06N 3/02; G06N 3/0454; G06N 3/084; G06V 20/56; G06V 20/58; G06V 20/584; G05D 1/0088; G05D 2201/0213; G08G 1/162; G08G 1/166; G08G 1/165
See application file for complete search history.

(56) References Cited

U.S. PATENT DOCUMENTS

| | | |
|---|---|---|
| 6,276,742 B1 | 8/2001 | Deng et al. |
| 6,431,001 B1 | 8/2002 | Tsuzuki et al. |
| 7,562,928 B1 | 7/2009 | Morazan |
| 7,967,366 B1 | 6/2011 | Tellez |
| 8,419,107 B2 | 4/2013 | Manchanda |
| 8,502,653 B2 | 8/2013 | Tsuzuki |
| 8,816,876 B2 | 8/2014 | Jones et al. |
| 9,283,834 B1 | 3/2016 | Khoury |
| 10,063,110 B2 | 8/2018 | Meichle |
| 2006/0066128 A1 | 3/2006 | Walker |
| 2006/0213714 A1 | 9/2006 | Igawa |
| 2012/0016553 A1 | 1/2012 | Bai |
| 2013/0320103 A1 | 12/2013 | Margalit |
| 2015/0075735 A1 | 3/2015 | Sene |
| 2015/0166072 A1 | 6/2015 | Powers et al. |
| 2015/0253775 A1 | 9/2015 | Jacobus et al. |
| 2017/0203712 A1 | 7/2017 | Aiba et al. |
| 2018/0143298 A1 | 5/2018 | Newman |
| 2018/0172828 A1* | 6/2018 | Moody ................. G06V 40/10 |
| 2018/0181133 A1 | 6/2018 | Zhang et al. |
| 2018/0208196 A1* | 7/2018 | Kurata ................. B60W 30/09 |
| 2018/0218606 A1* | 8/2018 | Michalakis .......... G05D 1/0234 |
| 2018/0284268 A1 | 10/2018 | McWhirter |
| 2018/0319376 A1 | 11/2018 | Dusina et al. |
| 2018/0328752 A1* | 11/2018 | Tomatsu .............. G01C 21/365 |
| 2018/0336785 A1* | 11/2018 | Ghannam ......... B60W 30/0956 |
| 2020/0130688 A1* | 4/2020 | Kline .................... B60W 10/11 |
| 2020/0231160 A1* | 7/2020 | Zass ................ B60W 30/18163 |
| 2020/0409912 A1* | 12/2020 | Dong .................... G06F 16/285 |

FOREIGN PATENT DOCUMENTS

| | | |
|---|---|---|
| DE | 10013393 A1 | 1/2002 |
| DE | 102012210255 A1 | 12/2013 |
| DE | 102012224479 A1 | 7/2014 |
| GB | 2530405 A | 3/2016 |
| JP | 2010108371 A * | 5/2010 |
| JP | 2010108371 A | 5/2010 |
| KR | 1020160043274 A | 4/2016 |

OTHER PUBLICATIONS

Response to Non-Final Office Action filed via EFS Jun. 20, 2019.
GB Search Report dated Oct. 30, 2018 re GB Appl. No. 1807946.7.
Supplemental IDS filed via EFS Oct. 30, 2018.
Notice of Allowance dated Jul. 10, 2019, U.S. Appl. No. 15/598,797.

* cited by examiner

VEHICLE DEBRIS STRIKE MITIGATION

BACKGROUND

Environmental conditions such as snow, freezing rain, etc., can cause ice and/or snow, possibly mixed with other particulate accumulation, to build up on a vehicle body. A chunk of built-up ice or snow may detach and strike another vehicle. For example, due to wind, lateral acceleration, etc., ice may detach and fall from the vehicle. Moreover, debris from or generated by another vehicle, e.g., a truck causing a rock or pebble to become airborne, can cause damage. Such debris striking a second vehicle may damage the second vehicle. For example, a vehicle window, body panel, sensors such as camera sensors, LIDAR sensors, etc., mounted to or at an exterior surface of etc. may be damaged because of an ice or pebble strike. This may happen on a road and/or in off-road job site, e.g., a mining area.

DETAILED DESCRIPTION

Introduction

Figure 1:
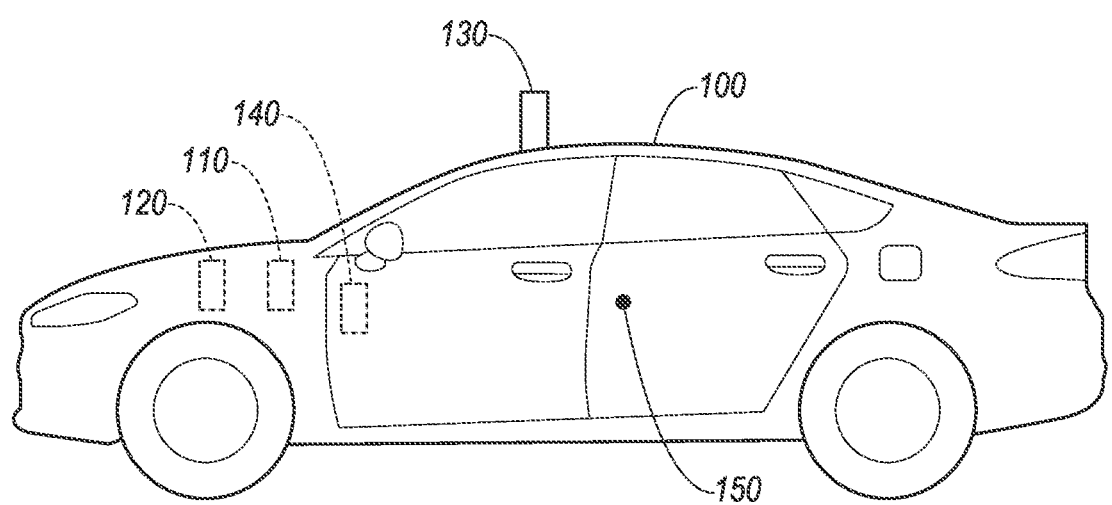
FIG. 1 is a diagram showing an example vehicle.

Disclosed herein is a vehicle computer, comprising a processor and a memory. The memory stores instructions executable by the processor to detect debris flying above a roadway, to input vehicle sensor data to a first classifier that outputs a source of the debris, based on the source of the debris, to compare sensor data representing the debris to stored reference data to determine a type of physical material included in the debris, to input the type of physical material and an environmental condition to a second classifier that outputs a risk assessment, and to actuate the vehicle based on the risk assessment.

The instructions may further include instructions to actuate the vehicle, based on the risk assessment, to at least one of reducing speed, passing a source of the debris, changing a lane, navigating to a low-risk area, and actuating a sensor protection cover.

The instructions may further include instructions to classify the source of the debris based on the environmental condition received from a remote computer and the sensor data received from the vehicle sensor.

The instructions may further include instructions to determine a shape and dimensions of the debris based on an image of the debris received from the vehicle sensor and the stored reference data including a lookup table, to determine elasticity of the debris based on the determined shape and dimensions, to evaluate a sound characteristic of the debris hitting a surface, and to determine the type of the debris based on the determined shape and dimensions, the elasticity, the sound characteristic, and the received image of the debris.

The source of the debris may be one of a natural source and an artificial source.

The instructions may further include instructions to apply a trained neural network to inputs including determined shape and dimensions, an elasticity, a sound characteristic, and received image of the debris, and to determine the type of the debris based on an output of the trained neural network.

The type of the debris may be one of an ice, rain, gravel, equipment, stone, and dirt.

The instructions may further include instructions to assess the risk of debris based on the debris type, a vehicle speed, a vehicle orientation, a rate of a debris fall, a damage type, and an impact force.

The instructions may further include instructions to determine the impact force based on an estimated mass of the debris, the vehicle speed, a debris velocity, an impact surface, and the debris type.

The instructions may further include instructions to predict the impact surface based on the vehicle speed and a trajectory of the debris, to determine a criticality level of the predicted impact surface based on position of vehicle sensors, and to determine the risk of debris based on the determined criticality level of the predicted impact surface and an operation of the vehicle.

The second classifier output may be based on a plurality of inputs and a plurality of thresholds, each corresponding to one of the inputs, wherein the risk assessment is determined based on a number of inputs that exceed a corresponding threshold.

The instructions may further include instructions to operate the vehicle based on the assessed risk, a rate of debris fall, and received map data.

The instructions may further include instructions to, based on the received map data, traverse a second route or move the vehicle to a protected area including a garage, a tunnel, or a vehicle platoon.

The instructions may further include instructions to send an alert to a second vehicle upon determining that a number of hits by a debris exceeds a threshold and a risk of damage exceeds a risk threshold.

Further disclosed herein is a method, comprising detecting debris flying above a roadway, inputting vehicle sensor data to a first classifier that outputs a source of the debris, based on the source of the debris, comparing sensor data representing the debris to stored reference data to determine a type of physical material included in the debris, inputting the type of physical material and an environmental condition to a second classifier that outputs a risk assessment, and actuating the vehicle based on the risk assessment.

The method may further include comprising actuating the vehicle, based on the risk assessment, to at least one of reduce speed, pass a source of the debris, change a lane, navigate to a low-risk area, and actuate a sensor protection cover.

The method may further include classifying the source of the debris based on the environmental condition received from a remote computer and the sensor data received from the vehicle sensor.

The method may further include determining a shape and dimensions of the debris based on an image of the debris received from the vehicle sensor and the stored reference data including a lookup table, determining elasticity of the debris based on the determined shape and dimensions, evaluating a sound characteristic of the debris hitting a surface, and determining the type of the debris based on the determined shape and dimensions, the elasticity, the sound characteristic, and the received image of the debris.

The source of the debris may be one of a natural source and an artificial source.

The method may further include applying a trained neural network to inputs including determined shape and dimensions, an elasticity, a sound characteristic, and received image of the debris, and to determine the type of the debris based on an output of the trained neural network.

Further disclosed is a computing device programmed to execute any of the above method steps. Yet further disclosed is a vehicle comprising the computing device.

Yet further disclosed is a computer program product, comprising a computer-readable medium storing instructions executable by a computer processor, to execute any of the above method steps.

Exemplary System Elements

A vehicle computer can be programmed to detect debris flying above a roadway 200, to input vehicle sensor data to a first classifier that outputs a source of the debris. Then, based on the source of the debris, the computer can further execute programming to compare sensor data representing the debris to stored reference data to determine a type of physical material included in the debris, to input the type of physical material and an environmental condition to a second classifier that outputs a risk assessment. The computer can then actuate the vehicle (i.e., one or more components in the vehicle) based on the risk assessment. Actuating the vehicle based on the risk assessment advantageously may prevent damage to the vehicle.

FIG. 1 illustrates a vehicle 100. The vehicle 100 may be powered in a variety of known ways, e.g., with an electric motor and/or internal combustion engine. The vehicle 100 may be a land vehicle such as a car, truck, etc. The vehicle 100 may be an off-road land vehicle such as a mining hauler, forestry machinery, etc. A vehicle 100 may include a computer 110, actuator(s) 120, sensor(s) 130, and a human-machine interface (HMI 140). A vehicle 100 has a geometrical center point 150, e.g., points at which respective vertical, longitudinal, and lateral centerlines of the vehicle 100 intersect. Alternatively or additionally, in one example, the center point 150 may be at a center of gravity of the vehicle 100.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicles 100 propulsion, braking, and steering.

The computer 110 may include programming to operate one or more of land vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface with other vehicles such as a second vehicle 101, e.g., via a vehicle-to-vehicle communication network. The V-to-V communication network represents one or more mechanisms by which the computers 110 of vehicles 100 may communicate with other vehicles 100, 101, and may be one or more of wireless communication mechanisms, including any desired combination of wireless (e.g., cellular, wireless, satellite, microwave and radiofrequency) communication mechanisms and any desired network topology (or topologies when multiple communication mechanisms are utilized). Exemplary V-to-V communication networks include cellular, Bluetooth, IEEE 802.11, dedicated short-range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100.

The sensors 130 may include a variety of devices known to provide data to the computer 110. For example, the sensors 130 may include Light Detection And Ranging (LIDAR) sensor(s) 130 disposed on a top, front, rear, etc., of the vehicle 100 that provide relative locations, sizes, and shapes of other vehicles surrounding the vehicle 100, e.g., a second vehicle 101 (see FIG. 2) travelling in front of, next to, and/or behind the vehicle 100. As another example, one or more radar sensors 130 fixed to vehicle 100 bumpers may provide relative locations of the second vehicles 101 traveling in front, next to, and/or rear of the vehicle 100.

Further, the sensors 130 may include camera sensor(s) 130, e.g. front view, side view, etc., providing images from an area surrounding the vehicle 100. For example, the computer 110 may be programmed to receive image data from the camera sensor(s) 130 and to implement image processing techniques to detect lane markings, and other objects such as vehicles 101. The computer 110 may be further programmed to determine a current driving path of the vehicle 100, e.g., based on (Global Positioning System) GPS coordinates and/or detected lane markings.

A vehicle can follow a path P, i.e., a straight or curved line on the ground surface along which the vehicle 100 moves. For example, a path P may be represented by a polynomial of third-degree (sometimes referred to as a "path polynomial") such as $Y=aX+bX^2+cX^3$. Y and X represent longitudinal and lateral coordinates, e.g., with respect to the reference point 150. Parameters a, b, and c of such a polynomial may determine a path curvature, on which the vehicle 100 travels. A path P may be determined by a vehicle computer 110 based in part on a planned vehicle 100 route, as well as based on detecting objects, available travel surfaces, etc. Typically a path P is a straight and/or curved line specified on a ground surface starting from a current location of the vehicle 100 extending with a maximum predetermined length, e.g., 100 meters, from the vehicle 100 location. The computer 110 may be programmed to actuate vehicle 100 actuators 120 such that the vehicle 100 traverses the path P.

Based on data received from the sensors 130, the computer 110 may determine a relative distance, speed, etc. of other vehicles 101 relative to the vehicle 100. As another example, the computer 110 may be programmed to receive data including relative speed, location coordinates, and/or headings of other vehicles 101 via the wireless communication network. For example, the computer 110 may receive such data from GPS sensors disposed in other vehicles 101 that provides geographical coordinates, movement direction, etc., of the second vehicles 101.

The vehicle 100 computer 110 may be programmed to detect objects attached to, on top of, and/or inside other vehicles 101 based on data received from, e.g., LIDAR sensors 130, radar sensor(s) 130, and/or camera sensors 130. In the present context, any material flying over roadway such as gravel load, objects, ice piece, etc. falling off a second vehicle 101 and/or an object, e.g., a rock, thrown away from under a wheel of a vehicle 101 is referred to as debris 210. For example, the computer 110 may be programmed to detect debris 210 such as cargo material (e.g., gravel) on a hauler vehicle 100, loaded objects on a cargo vehicle 100, around an exterior of a second vehicle 101 exterior, and/or material such as rocks thrown from under a wheel of a second vehicle 101. In one example, the computer 110 may be programmed to determine a shape and/or size of the debris 210 based on the sensor 130 data, as discussed below. Additionally, the computer 110 may be programmed to detect a movement of a piece of debris 210 relative to the second vehicle 101 which is typically an indication of detachment from the vehicle 101. The computer 110 may be programmed to detect a change in a location of the debris 210 relative to the vehicle 101 based on the sensor 130 data and to determine a movement, i.e., beginning with a detachment, of the debris 210 from the vehicle 101.

A vehicle 100 sensor 130 such as a LIDAR sensor 130 may further include a protective cap that can be actuated to close to protect the sensor 130 from damage by a debris 210 strike. For example, the sensor 130 may include an actuator 120 such as an electromechanical actuator 120 to close and/or open a protective cap of the sensor 130. A LIDAR sensor 130 may be mounted on a vehicle 100 roof, pillar, etc. and therefore exposed to a risk of debris 210 strike. Thus, advantageously, closing the protective cap of the sensor 130 can protect the sensor 130 from damage. When a sensor 130 protective cap is closed, the sensor 130 does not provide sensor 130 data to the computer 110. The computer 110 may further be programmed to transition operation of the vehicle 100 to a semi-autonomous or non-autonomous mode from a fully autonomous or semi-autonomous mode upon closing the protective cap of the sensor 130.

The HMI 140 may be configured to receive information from a user, such as a human operator, during operation of the vehicle. Moreover, an HMI 140 may be configured to present information to the user. Thus, an HMI 140 may be located in the passenger compartment of the vehicle 100. For example, the computer 110 may output information to HMI 140 indicating a vehicle 100 deceleration and/or lane change to prevent a risk of a debris 210 strike.

Figure 2:
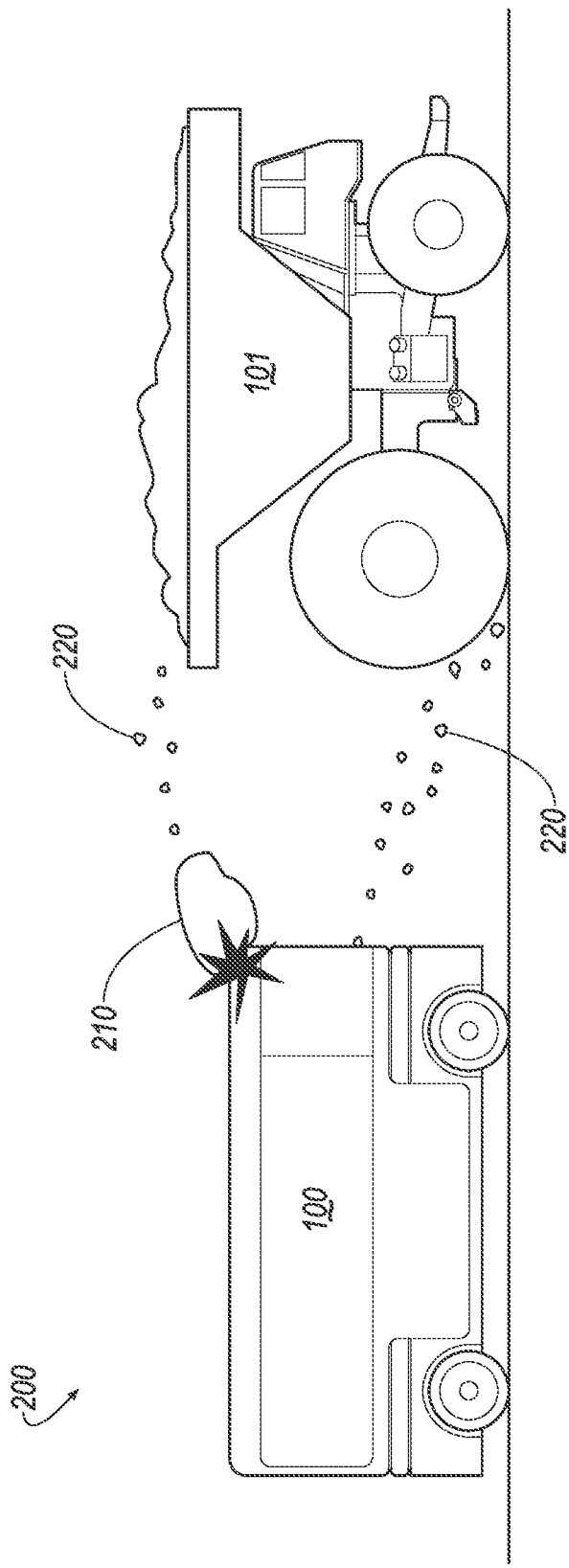
FIG. 2 is a diagram showing multiple vehicles and debris flying over a roadway.

Turning to FIG. 2, the roadway 200 is any ground surface on which a vehicle 100 moves, including without limitation a road surface, parking area, off-road surfaces, e.g., a mine, forestry or construction worksite, a warehouse floor, etc. A vehicle 100 computer 110 can be programmed to detect debris 210 flying (i.e., airborne and moving) above a roadway 200, to input vehicle 100 sensor 130 data to a first classifier that outputs a source of the debris 210, and based on the source of the debris 210, to compare sensor 130 data representing the debris 210 to stored reference data to determine a type of physical material included in the debris 210. The computer 110 can be programmed to input the type of physical material and an environmental condition to a second classifier that outputs a risk assessment, and to actuate the vehicle 100 based on the risk assessment.

A source of the debris 210 can be (i) a natural source, e.g., ice, hail, woods such as twigs or branches from a tree, etc., or (ii) an artificial source, e.g., a second vehicle 101. Thus, debris 210 may include cargo material, equipment, vehicle 101 parts, etc. The vehicle 100 computer 110 may be programmed to classify the source of the debris 210 based on an environmental condition such as snow, rain, etc., received from a remote computer and sensor 130 data received from the vehicle 100 sensor 130. That is, natural sources of debris mentioned above are more likely to occur during certain environmental conditions (e.g., freezing rain or high winds) than others (e.g., a dry, calm, sunny day).

A classifier, e.g., a first classifier, is a computer program that outputs classification data based on data that is input to the classifier. For example, the computer 110 may be programmed based on a neural network such as a Deep Neural Network (DNN) to classify a source of the debris 210. The DNN may be trained to classify the source. The DNN is a computer program that can be loaded in memory and executed by a processor included in a computer, e.g., the computer 110. The DNN 400 can include input nodes, each accepting a set of inputs. The DNN can include one or more output nodes. The DNN includes a plurality of layers each layer including one or more nodes. The nodes are sometimes referred to as artificial neurons because they are designed to emulate biological, e.g., human, neurons. A neuron block illustrates inputs to and processing in an example artificial neuron.

The DNN can be trained to accept input image data, e.g., camera image data from the sensor(s) 130, audio data from a vehicle 100 audio sensor 130, weather (or environmental) condition data from a remote computer, etc., and to output the source of the debris 210. The DNN can be trained with ground truth data, i.e., data about a real-world condition or state, possible examples of which are discussed below. Training the DNN can including updating weights and biases of the DNN via conventional techniques such as back-propagation with optimizations.

Training may be an iterative operation. In one example, the computer 110 may be programmed to perform an iterative training until an error, i.e., a difference between an expected output (based on training data) relative to an output from the trained DNN, is less than a specified threshold, e.g., 10%. In the present context, source ground truth data may include a set of sensor 130 data, e.g., 50 ground truth sets, each set including a corresponding ground truth source classifier. Thus, the training data may include various debris types (e.g., 25 examples of artificial source and 25 examples of natural source) and various weather conditions. For example, the threshold for determining whether the DNN is trained may be a maximum permitted deviation of 10%.

Additionally or alternatively, to classify the source of the flying debris 210, the computer 110 may be programmed to determine whether inclement weather such as snow, rain, wind, etc., is present. Upon detecting inclement weather, the computer 110 may classify a source of a detected debris 210 as natural; otherwise the computer 110 may be programmed to classify a source of a flying debris 210 to be artificial.

The type (i.e., class or classification) of debris 210 specifies a type of physical material included in the debris 210, e.g., ice, rain, gravel, equipment, stone, dirt, etc. Additionally, a debris 210 type may include a description of a size of the debris 210, e.g., small rock (e.g., less than 2 centimeters in diameter), large rock (e.g., 2 centimeters in diameter or larger), etc. Types of physical material specifying a debris type may thus include examples such as large ice chunk, small ice chunk, small low-density gravel, small high-density gravel, substantially round stone, non-geometric rocks, dirt, ice and rock mix, vehicle part, cargo container, tree branch, tree trunk, heavy equipment, etc.

Stored reference data are data used for determining the type of debris 210. Reference data may pertain to a physical measurement, e.g., based on visual and/or audio data that a classifier can use to determine a type of debris 210. Table 1 lists examples of reference data that can be used to determine a debris 210 type. Reference data may be determined using empirical techniques. For example, example items of debris 210, e.g., spheres with 10 centimeter (cm) diameter, may be formed of various physical material such as stone, metal, ice, concrete, glass, etc. Each of the example debris 210 pieces may fall from, e.g., 1 meter, and hit a vehicle 100 body panel such as a hood. The vehicle 100 computer 110 may receive the audio data of the generated sound of the fall. Then, the computer 110 or a lab computer may determine a frequency range and/or amplitude range of the generated sound. A lab computer or the like may generate, based on human input, statistical methods, etc., a frequency range associated with respective physical materials.

TABLE 1

| Datum | Physical Measurement |
|---|---|
| Sound | A frequency range and/or and amplitude range. |
| Rate of falling | Average number of bounces of debris on a specified surface, e.g., vehicle exterior surface |
| Shape | Image data and/or dimensions may specify shape of different physical material, e.g., gravel, ice, dirt, etc. |
| Elasticity | Elasticity of different types of physical material based on sound data, image data showing a height of bounce, etc. |

The computer 110 may be programmed to determine a shape and dimensions of the debris 210 based on an image of the debris 210 received from the vehicle 100 sensor 130 and stored reference data including a lookup table. For example, the computer 110 may store a lookup table including dimensions of different type of physical material, e.g., including a first dimension range of 2 to 64 millimeter (mm) for pebble or gravel, a second dimension range of less than 2 mm for sand, etc. Additionally or alternatively, the computer 110 may be programmed to determine the shape and dimensions of the debris 210 based on an output of a classifier such as a trained Deep Neural Network, as discussed below. The computer 110 may store reference data such as a set of reference images of various shapes, e.g., geometrical shapes such as round, oval, rectangular, trapezoidal, etc., and/or non-geometrical shapes. The computer 110 may store reference data including shapes of each debris 210 type, e.g., a lookup table including one or more shapes of each debris 210 type. The computer 110 may be programmed to determine a shape and dimensions of the debris 210 based on the received image data, and may determine the type of the debris 210 based on the stored reference data and the determines shape and dimensions.

Shape and/or dimensions may be insufficient to distinguish between various types of debris 210 because respective objects that are different types of debris 210, e.g., ice, metal, etc., may have similar shape and/or dimensions. Thus, as discussed below, the computer 110 may determine the type based on additional inputs including color, reflectivity, etc. Reference data for identifying a debris 210 type may include color, reflectivity, dimensions, shape, etc., of different types of material. The computer 110 may be programmed to determine a reflectivity and/or color of an item of debris 210 based on the received image data, and to determine the type of the debris 210 material further based on the determined reflectivity, color, etc., and the reference data including reflectivity, color, etc. of different physical materials.

The computer 110 may determine an elasticity of the debris 210 based on the determined shape and dimensions of the debris 210. Image data of debris 210 including shape, dimensions, color, reflectivity, etc., of different debris 210 material may be similar. Thus, in some examples, the computer 110 may be programmed to evaluate a sound characteristic, i.e., an amplitude and/or frequency of sound determined from audio data, of the debris 210 hitting a surface, e.g., vehicle 100 exterior surface, and estimate the elasticity of the debris 210 based on the sound characteristic of the debris 210.

In the present context, elasticity is an ability of a material to resist a distorting force and to return to its original size and shape when that force is removed. For example, elasticity may be specified in Pascal (Pa). When a debris 210 hits a surface, e.g., road surface, vehicle 100 exterior surface, etc., then the debris 210 may bounce off. In some instances, the debris 210 may bounce off a surface multiple times. How high (i.e., vertical distance) and/or how many times a debris 210 bounces off a surface is at least based on elasticity of the debris 210 and the surface. A sound (frequency and/or amplitude) of bouncing off a surface may be correlated to an elasticity of the debris 210 and/or an elasticity of the surface, e.g., vehicle 100 exterior surface. Additionally, how high (i.e., vertical distance) and/or how many times an object of debris 210 bounces off a surface is based on a shape of the debris 210. For example, a round shaped debris 210 may bounce higher and more often compared to a debris 210 having one or more edges such as a non-geometrical shape, triangular shape, etc.

The computer 110 may be programmed to detect debris 210 hitting a surface based on sensor 130 data such as visual data or audio data, and to determine an elasticity of the debris 210 based on a height of a bounce based on image data, a number of bounces based on image and/or audio data, a sound of bouncing based on audio data, etc., and an estimated elasticity of the surface on which the debris 210 hits, e.g., an estimated elasticity of the road surface, vehicle 100 exterior surface, etc. For example, the computer 110 may determine a number of bounces based on number of peaks of an audio signal associated with the debris 210 fall. For example, the computer 110 may cross-verify the sound of the debris 210 bouncing on the surface based on image data showing the fall of the debris 210. The computer 110 may store reference data such as a lookup table including an elasticity corresponding to a height of a bounce, a number of bounces, a sound of a bounce, etc. The computer 110 may further store reference data specifying a type of physical material based on the elasticity of the material. For example, the computer 110 may store a table, each row specifying a range of elasticity and one or more types of physical material. This elasticity data may be used to determine a type of the debris 210.

The computer 110 may be programmed to determine the type of the debris 210 based on the determined shape and dimensions, the elasticity, the sound characteristic, and the received image including the debris 210. For example, as discussed below, a DNN may be trained to determine the type of a debris 210 based on inputs including image data, audio data, etc.

The computer 110 may be programmed to apply a trained neural network, e.g., a DNN, to inputs including determined shape and dimensions, the elasticity, the sound characteristic, and the received image including the debris, and to determine the type of the debris 210 based on an output of the trained neural network.

The DNN may be trained using training data including training input data and corresponding expected output data. For example, the training data may include sensor 130 data, e.g., visual data, audio data, etc., for various example debris 210 such as gravel flying over a hauler vehicle 101, ice detaching from a second vehicle 101, rocks flying over roadway 200 which are thrown away from underneath a wheel of a second vehicle 101, etc. Additionally, the training data may include reference data such as lookup table of elasticity of different types of physical material, etc. In other words, physical characteristics such as shape, density, elasticity, color, reflectivity, etc., of different types of material may be used to train the DNN to determine the type of debris 210 material. A physical characteristic herein may be, e.g., an elasticity of a material known from material science, a density of a physical material, etc.

As discussed above, the computer 110 may be programmed to operate the vehicle based on an assessed risk output from a second classifier. A classifier, as discussed above, is a computer program that outputs classifier data based on data inputted to the classifier. In one example, second classifier output(s) may be based on input(s) and threshold(s), each corresponding to one of the inputs. A risk may be assessed based on a number of inputs that exceed a corresponding threshold. In one example, a risk may be assessed based on whether an input, e.g., a dimension of an item of debris 210, exceeds a threshold, e.g., a diameter threshold. As discussed above, the computer 110 may determine multiple inputs such as shape, dimension, elasticity, type, a rate of bounce, etc. Each of the inputs can be compared to a respective threshold, e.g. a threshold for rate of fall of debris 210, a vehicle 100 speed threshold, sound amplitude threshold, etc. Thus, the computer 110 may be programmed to store a lookup table including a threshold for each of inputs, e.g., an elasticity threshold, a dimension threshold, a sound amplitude threshold, a threshold of rate of debris 210 fall, etc., and to assess the risk of a debris 210 based on whether one or more inputs exceed a corresponding threshold. The rate of debris 210 fall is an average number of pieces of a type of debris 210 falling from a source, e.g., pieces of gravel falling from a hauler vehicle 101. The rate of debris 210 fall may be specified in parts (pieces) per minute. Alternatively, the rate of debris 210 fall may be specified in levels, e.g., low, medium, high, etc. The computer 110 may be programmed to determine the rate of fall of debris 210 based on received image data, e.g., including multiple successive images to determine a number of items of debris 210 falls within a specified time (e.g., 1 minute).

In one example, the computer 110 may be programmed to determine the assessed risk from one of multiple risk levels, e.g., low, medium, high, etc., based on a number of inputs that exceed a corresponding threshold. For example, the risk assessment may be determined to be "low" when at most one input exceeds the threshold, "medium" when at most two inputs exceed the corresponding thresholds; "high" when more than two inputs exceed the corresponding thresholds.

Additionally or alternatively, the computer 110 may be programmed to assess the risk of debris 210 based on the debris 210 type, a vehicle 100 speed, a vehicle 100 orientation, a rate of a debris fall, a damage type, and an impact force.

The vehicle 100 orientation, in the present context, is a direction of a vehicle 100 longitudinal axis on a ground surface, e.g., on the roadway 200. Damage type includes cosmetic damage, minor operational damage, or severe operational damage. Cosmetic damage is a dent, scratch, etc., on a vehicle 100 exterior surface, a chip in a vehicle 100 window, etc., that does not noticeably or substantially affect vehicle 100 operation. Minor damage is damage to a vehicle 100 sensor 130 and/or actuator 120 which may impair an operation of the vehicle 100 that is not critical or needed for the vehicle 100 to safely move. For example, damage to an AM radio antenna could be minor damage. Severe damage is a damage that may impair ability of the vehicle 100 to safely move, and thus may prevent the vehicle 100 from navigating to a vehicle 100 destination, e.g., a damage to a vehicle 100 LIDAR sensor 130 providing data from a forward-direction of the vehicle 100 moving in the forward-direction. An impact force $F_{imp}$ (or pressure) is a force applied by a flying debris 210 to an exterior surface of the vehicle 100. An impact force $F_{imp}$ may be specified in Pascal (Pa).

The computer 110 may be programmed, using kinematics techniques, as discussed below, to estimate an impact force $F_{imp}$ of a debris 210 based on a mass M of the debris 210, a velocity V of the debris 210 relative to the vehicle 100, and/or an impact surface A. A mass of the debris 210 may be specified in kilogram (kg), etc. A velocity V of the debris 210 relative to the vehicle 100 may be determined based on a vehicle 100 speed, a debris 210 speed, and a direction of movement of the debris 210 relative to the vehicle 100. The velocity V of the debris 210 relative to the vehicle 100 may be specified in meter per second (m/s), etc. For example, the computer 110 may determine the velocity V of the debris 210 with reference to a coordinate system at the vehicle 100 reference point 150 based on image data received from the vehicle 100 sensor(s) 130 (i.e., by comparing successive images at specified times), vehicle 100 speed sensor 130, etc. The debris 210 velocity V may be specified with a vector having (i) a direction specified with reference to the coordinate system at the vehicle 100 and (ii) a scalar velocity value. An impact surface A is a portion of the vehicle 100 exterior surface that can be specified in square centimeter ($cm^2$). The computer 110 may be programmed to estimate the impact surface A based on the dimensions and shape of the debris 210 and the dimensions and shape of the vehicle 100 body. For example, a round shaped item of debris 210 having a diameter d may cause an impact surface A approximately equal $\frac{1}{2}\pi d^2$.

An impact surface A may have a reference point, e.g., a center of a circular impact surface on a front bumper of the vehicle 100. The computer 110 may be programmed, based on Equation (1), to determine the impact force $F_{imp}$ of the debris 210. Operation f of Equation (1) may be determined based on known kinematic techniques. For example, kinetic energy KE may be measured using the equation $KE=\frac{1}{2}MV^2$, and impact force $F_{imp}$ may be determined by dividing the kinetic energy KE by the impact surface A.

$$F_{imp}=f(M,V,A) \quad (1)$$

The computer 110 may be programmed to estimate a volume of the debris 210 based on an estimated shape and dimensions of the debris 210. The computer 110 may be programmed to estimate a density of the physical material based on the determined type of physical material. The computer 110 may store a density of various types of debris 210 in a computer 110 memory, e.g., in a lookup table. The computer 110 may estimate the mass M of the debris 210 based on the determined density and volume of the debris 210.

The computer 110 may be programmed to predict the impact surface A based on the vehicle 100 speed and a trajectory 220 of the debris 210, to determine a criticality level of the predicted impact surface based on position of vehicle 100 sensors 130 and/or actuators 120, and to determine the risk of debris 210 based on the determined criticality level of the predicted impact surface and an operation of the vehicle 100.

A criticality level of a surface of the vehicle 100, in the present context, means a measure of risk or potential damage that could be caused by a debris 210 strike on a surface of a vehicle 100. A criticality level is determined based on a type of damage an impact of a debris 210 to the respective surface may cause. A criticality level may be defined as a number within a specified range, e.g., 1 (non-critical) to 5 (very critical), or as a set of descriptors, e.g., low, medium, and high. For example, a surface of a camera sensor 130 may have a criticality level of "high" whereas a surface of vehicle 100 hood may have a criticality level of "low." Position data of sensors 130 and/or actuators 120 on the vehicle 100 exterior surface may be 3D coordinates relative to a vehicle 100 reference point.

A trajectory 220 of the debris 210 may include a longitudinal, lateral, and/or vertical movement. A trajectory, e.g., a trajectory 220, in the present context, refers to an expected or projected movement path of a debris 210 flying over a roadway 200. A trajectory 220 may include curves and/or straight lines. A trajectory 220 may be specified with a polynomial including spatial coordinates X, Y, Z of the debris 210 relative to coordinate system, e.g., a Cartesian coordinate system. The computer 110 may be programmed to estimate the trajectory 220 of the debris 210 based on the vehicle 100 sensor 130 data. The computer 110 may determine the trajectory 220 in form of a polynomial equation based on spatial coordinates X, Y, Z of the debris 210. X, Y, and Z represent longitudinal, lateral, and altitude coordinates. For example, to determine the trajectory 220, the computer 110 may be programmed to determine 3D location coordinates of the debris 210 at two or more times (e.g., based on multiple image data including the debris 210) while the debris 210 flies over the roadway 200 and to fit a polynomial curve at the determined locations of the debris 210. An initial state of the trajectory 220 may be further based on a second vehicle 101 speed, acceleration, and location at a time of detachment of debris 210 from the second vehicle 101. An initial state of the trajectory 220 may include initial location, speed, and/or acceleration of the debris 210 at the time of detachment from the second vehicle 101. Additionally or alternatively, the debris 210 may be from natural sources such as a tree falling, etc., which may have a 0 (zero) initial speed and acceleration.

The computer 110 may be programmed to estimate an impact surface A on the vehicle 100 based on the estimated trajectory 220 of the debris 210 and the vehicle 100 path P. The computer 110 may be programmed to estimate the position of the impact surface A based on the trajectory 220 of the debris 210, the path P of the vehicle 100, and/or the speed of the vehicle 100. For example, the computer 110 may specify the trajectory 220 with a first polynomial specifying a line or path of debris 210 in three-dimensional space, and a vehicle 100 path P on a ground surface with a second polynomial. The computer 110 can then determine the location of the impact surface A based on respective lines defined by the two polynomials. The second polynomial may specify a path P of a reference point 150 of the vehicle 100. An impact may occur anywhere on an exterior surface of the vehicle 100 (i.e., any point on the exterior surface of the vehicle 100). Therefore, to define exterior surfaces of the vehicle 100 to determine whether, based on the vehicle path P and a trajectory 220 of debris 210, the debris 210 will impact the vehicle 100 exterior, the computer 110 may store information defining location coordinates of points on the exterior surface of the vehicle 100 relative to the reference point 150. For example, geometric models of a vehicle 100 may be used, where the reference point 150 is represented in the geometric model to allow the model to be translated to a coordinate system including the path P and trajectory 220. Thus, extrapolating from the reference point 150 on a path P, it is possible to determine whether a trajectory 220 intersects or will intersect with a vehicle 100 exterior surface. In one example, the computer 110 may determine or predict an impact on the exterior surface of the vehicle 100 upon determining that the trajectory 220 line of debris 210 defined by the first polynomial intersects with the exterior surface of the vehicle 100, i.e., any point on the exterior surface is also on the line defined by the first polynomial. Additionally or alternatively, the computer 110 may be programmed to predict the impact surface A based on the vehicle 100 speed, a path P of the vehicle 100, a trajectory 220 of the debris 210, and/or a speed of the debris 210. A position of an impact surface A may be 3D coordinates of a reference point (e.g., center point) of the impact surface relative to a vehicle 100 reference point, e.g., an intersection of a vehicle 100 longitudinal and lateral axes.

As discussed above, a damage type may be cosmetic, minor, or severe damage. Minor damage may be a damage to a sensor 130 and/or actuator 120 does not result in any restriction in vehicle 100 operation, e.g., a damage to a rear-facing sensor 130 while the vehicle navigates in a forward direction and no reverse movement is expected based on the planned route of the vehicle. Thus, the computer 110 may take into account the orientation of the vehicle 100 with respect to a source of debris 210, e.g., a hauler truck vehicle 101 behind the vehicle 100, while the vehicle 100 navigates in a forward direction. The computer 110 may be programmed to assess the risk based on the criticality level of the impact surface A, vehicle 100 orientation, a location of debris 210 source, e.g., a gravel hauler vehicle 101. For example, the computer 110 may determine the criticality based on the orientation of the vehicle 100 and the location of the source of the debris 210 that the a debris 210 from the determined source may cause a damage type cosmetic or minor (bur no severe damage). Thus, the computer 110 may be programmed to assess a low risk of debris 210 upon determining based on vehicle 100 orientation, the source of debris 210, etc., that a damage type of cosmetic or minor is possible.

In another example, the computer 110 may be programmed to assess a risk based on a criticality level of the predicted impact surface A to operation of the vehicle 100. Thus, the assessed risk may be in part based on an operation of the vehicle 100. For example, a surface of a vehicle 100 first sensor 130 with a high criticality level expected to provide data for a planned route of the vehicle 100 may have a high assessed risk, whereas a surface of a second sensor 130 (also, with a high criticality level) from which no sensor 130 data is expected in a planned route of the vehicle 100 may have a criticality level "medium." The computer 110 may store position data of sensors 130, actuators 120, and/or criticality level of each position of the exterior surface in a computer 110 memory.

The computer 110 may be programmed to actuate the vehicle 100 based on the risk assessment. The computer 110 may be programmed to reduce vehicle 100 speed, pass a source of the debris 210, change a lane, navigate to a low-risk area, and/or actuate a sensor 130 protection cover.

In one example, the computer 110 may be programmed to operate the vehicle 100 based on the assessed risk, a rate of debris 210 fall, and received map data. Table 2 shows an example set of vehicle 100 operations based on the assessed risk and the rate of debris 210 fall. For example, the computer 110 may be programmed to reduce a vehicle 100 speed by 10% upon determining a low risk and high rate of debris 210 fall. In another example, the computer 110 may be programmed to reduce the vehicle 100 speed by 50% or navigate the vehicle 100 to a low-risk area. The computer 110 may be programmed to determine, based on the received map data, whether the vehicle 100 can be navigated to a low-risk area. The computer 110 may actuate the vehicle 100 actuator(s) 120 to reduce the speed by 50%. The computer 110 may be programmed to actuate the vehicle 100 to traverse a second route or move the vehicle 100 to a protected area such as a garage, a tunnel, under a bridge, or a vehicle 100, 101 platoon. The computer 110 may be programmed to determine low risk protected area(s) based on map data and/or received data from a remote computer, e.g., environmental condition data. For example, upon determining hail as the type of debris 210, the computer 110 may determine areas under bridges, inside tunnels, etc. as low-risk areas.

TABLE 2

| Assessed Risk | Rate of debris fall | Operation |
| --- | --- | --- |
| Low | Low | No change in operation |
| Low | High | Reduce speed by 10% |
| Medium | Low | Reduce speed by 10% |
| Medium | High | Actuate protection cover or reduce speed by 20% |
| High | Low | Reduce speed by 50% or navigate to low-risk area |
| High | High | Navigate to low-risk (protected) area |

The computer 110 may be programmed to send an alert to a second vehicle 101 upon determining that a number of hits by a debris 210 exceeds a threshold, e.g., 1 per minute, and assessed risk of damage exceeds a threshold, e.g., medium or higher. The computer 110 may be programmed to send the alert via a V-to-V communication network.

Figure 3:
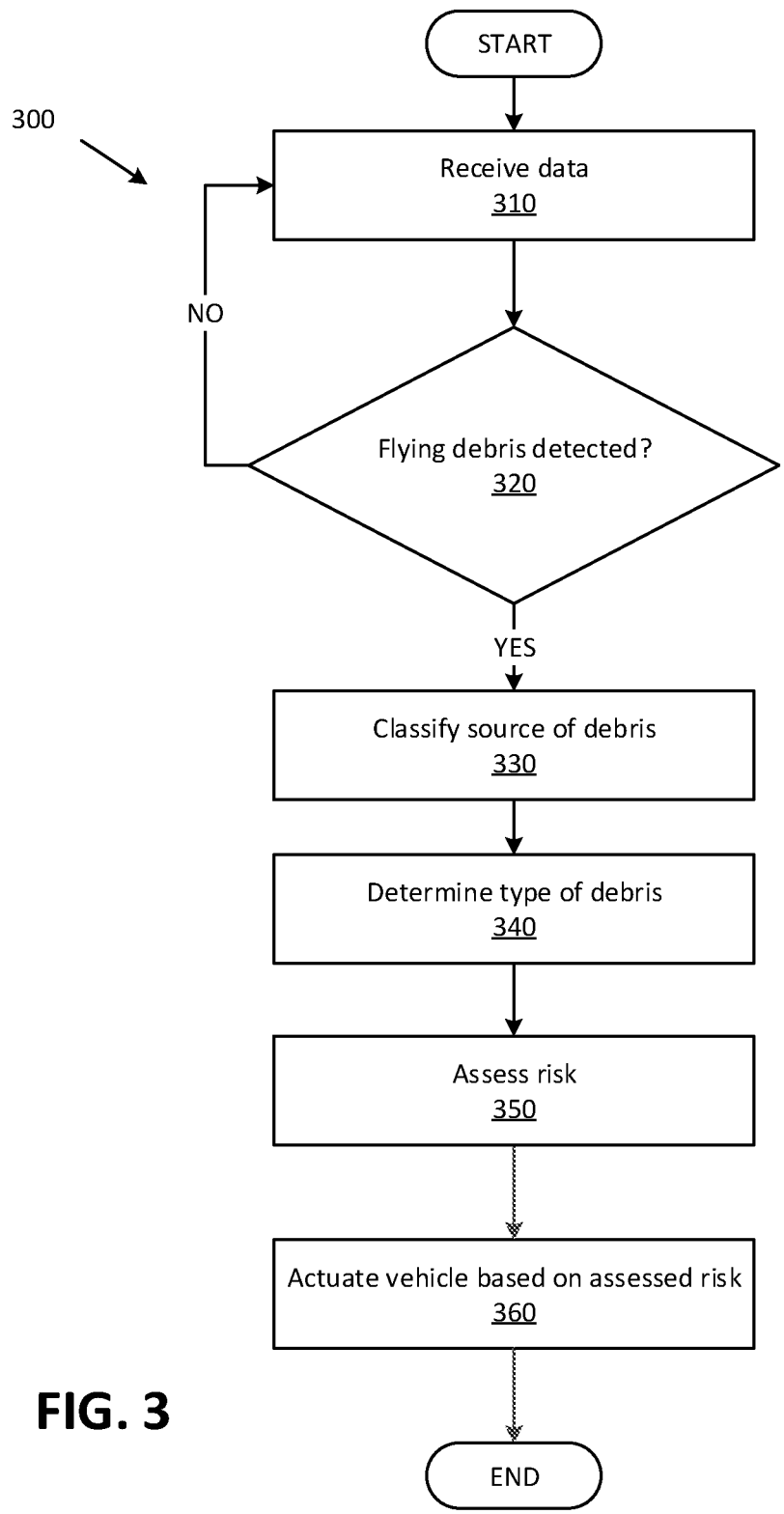
FIG. 3 is a flowchart of an exemplary process for operating the vehicle of FIG. 1.

FIG. 3 shows a flowchart of an exemplary process 300 for operating a vehicle 100. A vehicle 100 computer 110 may be programmed to execute blocks of the process 300.

The process 300 begins in a block 310, in which the computer 110 receives data, e.g., sensor 130 data from vehicle 100 LIDAR sensor 130, camera sensor 130, audio sensor 130, etc., environmental condition such as weather data from a remote computer, and/or vehicle 100 operation data such as planned route, speed, direction of movement, etc.

Next, in a decision block 320, the computer 110 determines whether flying debris 210 over roadway is detected. The computer 110 may be programmed to detect an item of debris 210 (i.e., a physical object) based on the received data, e.g., sensor 130 data. The computer 110 may be programmed to detect debris 210 using image processing techniques. If the computer 110 detects or predicted debris 210, then the process 300 proceeds to a block 330; otherwise the process 300 returns to a block 310.

In the block 330, the computer 110 classifies a source of debris 210, e.g., as one of natural or artificial. The computer 110 may be programmed to input vehicle 100 sensor 130 data to a first classifier, e.g., a DNN, that outputs a source of the debris 210. The DNN may be trained using training data including various debris 210 sources and respective source of debris 210, as discussed above. In another example, the computer 110 may be programmed to determine whether inclement weather such as snow, rain, wind, etc., is present. In one example, the computer 110 may be programmed to determine a severity of inclement weather in a range, e.g., 1 (good weather) to 10 (severe weather), and to classify a source of a detected debris 210 as natural; otherwise the computer 110 may be programmed to classify a source of a flying debris 210 to be artificial. Additionally or alternatively, the computer 110 may be programmed to classify a source of debris 210 based on image data received from a camera sensor 130, e.g., classifying the source as natural when snow, rain, wind, etc., detected and classifying the source as artificial when objects such as stone, gravel, etc., are detected.

Next, in a block 340, the computer 110 determines a type of the debris 210. The computer 110 may store reference data, e.g., Table 1, including multiple characteristics such as shape, dimensions, elasticity, sound, etc., of various debris 210 types. The computer 110 may be programmed to determine an elasticity of the debris 210 based on a height of a debris 210 bounce, a number of bounces, sound of bouncing, etc., and an estimated elasticity of the surface on which the debris 210 hits, e.g., an estimated elasticity of the road surface, vehicle 100 exterior surface, etc. The computer 110 may be programmed to determine the type of the debris 210 based on the determined shape and dimensions, the elasticity, the sound characteristic, and the received image including the debris 210.

Additionally or alternatively, the computer 110 may be programmed to determine the debris 210 type based on received data from other vehicles 101, a remote computer, etc. For example, the computer 110 may classify a type of a debris 210 based on a type of the debris 210 determined by a second vehicle 101, e.g., when the flying debris 210 is in a field of view of sensors 130 of the second vehicle 101 and a second vehicle 101 computer determines the type of debris 210 and transmits data including the debris 210 type via vehicle-to-vehicle communications or the like. In one example, the vehicle 100 computer 110 may determine a type of debris 210 same as the type determined by second vehicles 101 upon determining that a number of second vehicles 101 exceeding a threshold, e.g., 2, have determined the respective type for the flying debris 210.

Additionally or alternatively, the computer 110 may be programmed to apply a trained neural network, e.g., a DNN, to inputs including determined shape and dimensions, the elasticity, the sound characteristic, and the received image including the debris, and to determine the type of the debris 210 based on an output of the trained neural network.

Next, in a block 350, the computer 110 assess the risk of the debris 210. The computer 110 may be programmed to determine a risk of a debris 210 based on an output of a second classifier. A risk may be assessed based on a number of inputs that exceed a corresponding threshold. For example, the second classifier may be a DNN trained to output the risk of the debris 210 based on inputs such as image data, audio data, etc., received from the vehicle 100 computer. Additionally or alternatively, the computer 110 may be programmed to determine the risk of debris 210 based on a lookup table including a threshold for each of inputs, e.g., an elasticity threshold, a dimension threshold, a sound amplitude threshold, a threshold of the rate of fall of debris 210, etc. The rate of fall of debris 210 is an average number of pieces of a type of debris 210 falling from a source, e.g., pieces of gravel falling from a hauler vehicle 101

In one example, the computer 110 may be programmed to determine the assessed risk from one of multiple risk levels, e.g., low, medium, high, etc., based on a number of inputs that exceed a corresponding threshold. For example, the risk assessment may be determined to be "low" when at most one input exceeds the threshold, "medium" when at most two inputs exceed the corresponding thresholds; "high" when more than two inputs exceed the corresponding thresholds.

Additionally or alternatively, the computer 110 may be programmed to assess the risk of debris 210 based on the debris 210 type, a vehicle 100 speed, a vehicle 100 orientation, a rate of a debris fall, a damage type, and an impact force. The computer 110 may be programmed to determine the rate of debris 210 fall (e.g., using audio and/or image data), the impact force (e.g., based on dimensions, type of physical material, speed, etc.), and to determine the risk using a DNN trained to output the risk based on inputs including debris 210 type, impact force, rate of fall of debris, etc.

Next, in a block 360, the computer 110 actuates the vehicle 100 based on the assessed risk of the debris 210. The computer 110 may be programmed, e.g., based on a lookup table such as illustrated by Table 2, to reduce vehicle 100 speed, pass a source of the debris 210 (e.g., a second vehicle 101), change a lane, navigate to a low-risk area, and/or actuate a sensor 130 protection cover.

In one example, the computer 110 may be programmed, upon determining based on the vehicle 100 orientation and/or location relative to an artificial source of debris 210, e.g., a second vehicle 101, and a current operation of the vehicle 100, e.g., navigating in a forward direction, that a debris 210 may cause damage to a rear camera sensor 130 currently unused for navigation of the vehicle 100 in a forward direction, to cause a protection cover of the rear camera sensor 130 to close to protect the sensor 130 from the debris 210.

In another example, the computer 110 may be programmed to actuate the vehicle 100 based on the assessed risk of the debris 210, vehicle 100 planned route, map data, etc. In one example shown in Table 2, the computer 110 may be programmed to actuate the vehicle 100 based on the assessed risk, and the determined rate of debris 210 fall. The computer 110 may be programmed to identify the action based on assessed risk, rate of fall of debris 210, etc. For example, with reference to Table 2, the computer 110 may identify an action of reducing vehicle 100 speed by 20% upon assessing a medium level risk and a high rate of debris 210 fall. In another example, the computer 110 may identify an action of navigating to a low-risk area upon assessing a high level risk and determining a high rate of debris 210 fall. As discussed above, the computer 110 may identify the low-risk area based on the vehicle 100 route, type of debris 210, map data, etc. The computer 110 may be programmed to identify a low-risk area such as garage, parking structure, etc., based on the received map data, source of the debris 210, etc., and to navigate the vehicle 100 to the identified low-risk area.

The computer 110 may be programmed to send an alert to a second vehicle 101 upon determining that a rate of debris 210 fall exceeds a threshold, e.g., 1 per minute, and assessed risk of damage exceeds a threshold, e.g., medium or higher.

The computer 110 may be programmed to actuate the vehicle 100 to navigate in a platoon of vehicles 100. For example, upon determining an artificial source of the debris 210, e.g., gravel falling from a second vehicle 101, the computer 110 may be programmed to navigate the vehicle 100 in a platoon of vehicles 100 to protect the vehicle 100 from the debris 210. The computer 110 may navigate the vehicle 100 in a platoon of vehicles 100 behind a third vehicle 101 having larger dimensions than the vehicle 100, e.g., a height greater than the vehicle 100 height, that is located between the vehicle 100 and the second vehicle 101 which is the source of debris 210. Thus, the third vehicle 101 may protect the vehicle 100 from the debris 210 falling from the second vehicle 101.

Following the block 460, the process 300 ends, or alternatively returns to the block 310, although not shown in FIG. 3.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer-readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A vehicle computer, comprising a processor and a memory, the memory storing instructions executable by the processor to:
   detect debris flying above a roadway;
   input vehicle sensor data to a first classifier that outputs a source of the debris;
   based on the source of the debris, compare sensor data representing the debris to stored reference data to determine a type of physical material included in the debris;
   input the type of physical material and an environmental condition to a second classifier that outputs a risk assessment; and
   actuate the vehicle based on the risk assessment.

2. The vehicle computer of claim 1, wherein the instructions further include instructions to actuate the vehicle, based on the risk assessment, to at least one of reducing speed, passing a source of the debris, changing a lane, navigating to a low-risk area, and actuating a sensor protection cover.

3. The vehicle computer of claim 1, wherein the instructions further include instructions to classify the source of the debris based on the environmental condition received from a remote computer and the vehicle sensor data.

4. The vehicle computer of claim 1, wherein the instructions further include instructions to:
   determine a shape and dimensions of the debris based on an image of the debris received in the vehicle sensor data and the stored reference data;
   determine elasticity of the debris based on the determined shape and dimensions;
   evaluate a sound characteristic of the debris hitting a surface; and
   determine the type of the debris based on the determined shape and dimensions, the elasticity, the sound characteristic, and the received image of the debris.

5. The vehicle computer of claim 1, wherein the source of the debris is one of a natural source and an artificial source.

6. The vehicle computer of claim 5, wherein the instructions further include instructions to apply a trained neural network to inputs including determined shape and dimensions, an elasticity, a sound characteristic, and received image of the debris, and to determine the type of the debris based on an output of the trained neural network.

7. The vehicle computer of claim 1, wherein the type of the debris is one of an ice, rain, gravel, equipment, stone, and dirt.

8. The vehicle computer of claim 1, wherein the instructions further include instructions to output the risk assessment based on the type of physical material, a vehicle speed, a vehicle orientation, a rate of a debris fall, a damage type, and an impact force.

9. The vehicle computer of claim 8, wherein the instructions further include instructions to determine the impact force based on an estimated mass of the debris, the vehicle speed, a debris velocity, an impact surface, and the debris type.

10. The vehicle computer of claim 8, wherein the instructions further include instructions to:
    predict the impact surface based on the vehicle speed and a trajectory of the debris;
    determine a criticality level of the predicted impact surface based on position of vehicle sensors; and
    determine the risk of debris based on the determined criticality level of the predicted impact surface and an operation of the vehicle.

11. The vehicle computer of claim 1, wherein the second classifier output is based on a plurality of inputs and a plurality of thresholds, each corresponding to one of the inputs, wherein the risk assessment is determined based on a number of inputs that exceed a corresponding threshold.

12. The vehicle of claim 1, wherein the instructions further include instructions to operate the vehicle based on the risk assessment, a rate of debris fall, and received map data.

13. The vehicle of claim 12, wherein the instructions further include instructions to, based on the received map data, traverse a second route or move the vehicle to a protected area including a garage, a tunnel, or a vehicle platoon.

14. The vehicle computer of claim 1, wherein the instructions further include instructions to send an alert to a second vehicle upon determining that a number of hits by a debris exceeds a threshold and a risk of damage exceeds a risk threshold.

15. A method, comprising:
    detecting debris flying above a roadway;
    inputting vehicle sensor data to a first classifier that outputs a source of the debris;
    based on the source of the debris, comparing sensor data representing the debris to stored reference data to determine a type of physical material included in the debris;
    inputting the type of physical material and an environmental condition to a second classifier that outputs a risk assessment; and
    actuating the vehicle based on the risk assessment.

16. The method of claim 15, further comprising actuating the vehicle, based on the risk assessment, to at least one of reduce speed, pass a source of the debris, change a lane, navigate to a low-risk area, and actuate a sensor protection cover.

17. The method of claim 15, further comprising classifying the source of the debris based on the environmental condition received from a remote computer and the vehicle sensor data.

18. The method of claim 15, further comprising:
   determining a shape and dimensions of the debris based on an image of the debris received in the vehicle sensor data and the stored reference data;
   determining elasticity of the debris based on the determined shape and dimensions;
   evaluating a sound characteristic of the debris hitting a surface; and
   determining the type of the debris based on the determined shape and dimensions, the elasticity, the sound characteristic, and the received image of the debris.

19. The method of claim 15, wherein the source of the debris is one of a natural source and an artificial source.

20. The method of claim 19, further comprising applying a trained neural network to inputs including determined shape and dimensions, an elasticity, a sound characteristic, and received image of the debris, and to determine the type of the debris based on an output of the trained neural network.

\* \* \* \* \*